United States Patent Office 3,308,106
Patented Mar. 7, 1967

3,308,106
COPOLYMERS OF 3,4,5,5,5-PENTA-
FLUOROPENTADIENE-1,3
Anthony J. Butler, George A. Grindahl, and Ogden R.
Pierce, Midland, Mich., assignors to Dow Corning Corporation, Midland, Mich., a corporation of Michigan
No Drawing. Filed Jan. 9, 1964, Ser. No. 336,623
6 Claims. (Cl. 260—85.5)

This application relates to new, fluorinated copolymers that vary from tough, flexible, leathery plastics to elastomers, and which are highly stable in the presence of heat or solvents.

The copolymers of this invention consists essentially of (1)

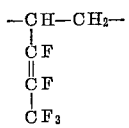

units and (2) at least one unit selected from the group consisting of

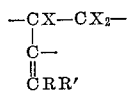

units, where X is selected from the group consisting of fluorine and hydrogen, at least one X being hydrogen, R is selected from the group consisting of fluorine, hydrogen and perfluoroalkyl radicals, and R' is selected from the group consisting of the trifluoromethyl radical and fluorine, the number of X's that are hydrogen exceeding the number of R's that are hydrogen;

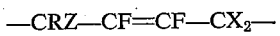

where Z is selected from the group consisting of the trifluoromethyl radical, fluorine, and hydrogen, X is selected from the group consisting of fluorine and hydrogen, and R is as defined above,

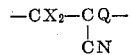

units; where X is as defined above, and Q is selected from the group consisting of hydrogen, fluorine, and methyl, there being at least one H atom present; and

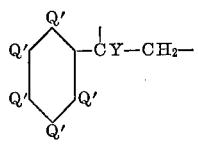

units, where Q' is selected from the group consisting of the trifluoromethyl group and fluorine, no more than two Q' groups being trifluoromethyl, and Y is selected from the group consisting of methyl radicals and hydrogen.

R can consist of fluorine and any perfluoroalkyl radical such as trifluoromethyl, pentafluoroethyl, perfluoroisobutyl, perfluorohexyl, perfluorodecyl, etc. It is preferred to use those perfluoroalkyl radicals that are of less molecular weight than perfluorohexyl.

The copolymers of this invention can be made by copolymerizing (1) $CF_3CF=CFCH=CH_2$ with (2) one or more of the following: $CRR'=CR-CX=CX_2$,

and

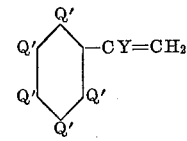

where the symbols are as defined above.

The copolymerization may be conveniently effected by emulsifying the ingredients and using a redox initiation, as in Example 2.

Ingredients (1) of the copolymers of this invention can be made by reacting perfluoropropene with ethanol, using a free radical catalyst:

$CF_3CF=CF_2 + CH_3CH_2OH \longrightarrow$

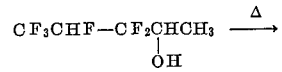

$CF_3CF=CF-CH=CH_2 + H_2O + HF$

The various compounds that can make up ingredient (2) are well known to the art.

It should be noted that the polymerization of ingredient (1) takes place only on the terminal double bond. This leaves olefinic pendant groups along the main chain. It should also be noted that the ingredients (2) can have pendant groups.

More than one species of ingredient (2) can be used if it is desired to make a copolymer with more than two types of polymeric units therein.

The preferred ingredient (2) is $CRR'=CR-CX=CX_2$.

The following examples are illustrative only and should not be construed as limiting the invention which is properly delineated in the appended claims.

Example 1

0.15 gram of $K_2S_2O_8$, 0.08 gram of sodium bisulfite, 0.008 gram of $FeSO_4 \cdot 7H_2O$, and 0.5 gram of potassium perfluorooctoate were placed as a dry powder into a polymer tube. After purging with nitrogen and cooling the tube, 32 grams of water buffered at a pH of 10, 9 grams of 3,4,5,5,5-pentafluoropentadiene-1,3 and 9 grams of vinylpentafluorobenzene was added. The $N_2$ pressure in the tube was then adjusted to atmospheric pressure for ease in sealing. The tube was placed in a vented steel jacket and agitated mildly in a hot water bath (45° C.) for 20 hours. The tubes were then frozen and the polymer removed, coagulated, and washed with warm water. It was then dried in warm air.

The product was a copolymer consisting essentially of

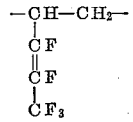

units and

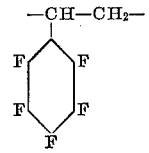

units.

Example 2

The following were placed in a glass polymerization ampule: 0.1 gram of $K_2S_2O_8$, 0.05 gram of sodium bisulfite, 0.005 gram of $FeSO_4 \cdot 7H_2O$, 0.5 gram of $C_7F_{15}COOK$, 32 grams of water, buffered at pH 10, 5 grams of $CF_2=CH-CH=CH_2$, and 10 grams of $CH_3CF=CFCH=CH_2$

The tubes were sealed and left in Dry Ice overnight. The tubes were then rotated in a hot water bath at 50° C. for about twenty hours.

The product was an emulsion, with no excess monomer detectable. It was found to contain a copolymer consisting essentially of

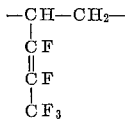

units and

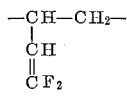

units.

*Example 3*

The following were placed in a glass polymerization ampule: 0.1 gram of $K_2S_2O_8$, 0.05 gram of sodium bisulfite, 0.005 gram of $FeSO_4 \cdot 7H_2O$, 0.6 gram of $C_7F_{15}COOK$, 32 grams of water buffered at pH 10, 15 grams of $CF_3CF=CFCH=CH_2$ and 6 grams of $$CF_2=CFCH=CH_2$$

The ampule was placed in a hot water bath at 50° C. for about 18 hours.

The product was washed in a mixture of methanol, water, and acetone, and then with water. It was then dried for 3 hours at 110° C.

The product was a copolymer consisting essentially of

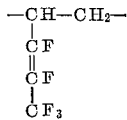

units and

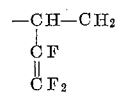

units. It was a snappy and very strong elastomer.

*Example 4*

The following were placed in a glass polymerization ampule: 0.15 gram $K_2S_2O_8$, 0.08 gram sodium bisulfite, 0.008 gram $FeSO_4 \cdot 7H_2O$, 0.5 gram $C_7F_{15}COOK$, 40 grams of water buffered at pH 10, 14 grams of $$CF_3CF=CF-CH=CH_2$$

and 10 grams of $CH_2=CHCN$. The tube was agitated in a hot water bath for 18 hours. The product was an expanded, solid copolymer consisting essentially of

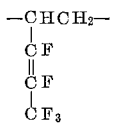

units and

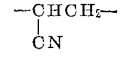

units.

After washing with methanol and oven drying, the copolymer was a white, thermoplastic powder.

*Example 5*

When the following compounds are copolymerized with $CF_3CF=CFCH=CH_2$ in the mol ratios stated in accordance with the method of Example 1, copolymers containing (A)

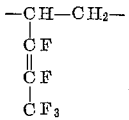

units, and (B) the following units are obtained.

| Mol Percent | Compound | Copolymer Unit B | Mol Percent A | Mol Percent B |
|---|---|---|---|---|
| 5 | $CF_3CF_2CF=CF-CF=CHF$ | —CF—CHF—<br>\|<br>CF<br>\|\|<br>CF—CF$_2$CF$_3$ | 95 | 5 |
| 1 | $C_{10}F_{21}CF=\overset{CF_3}{\underset{\|}{C}}-CH=CF_2$ | —CH—CF$_2$—<br>\|<br>CF$_3$—C<br>\|\|<br>CF—C$_{10}$F$_{21}$ | 99 | 1 |
| 99 | $(CF_3)_2C=\overset{CF(CF_3)_2}{\underset{\|}{C}}-CF=CH_2$ | —CF—CH$_2$—<br>\|<br>C—CF(CF$_3$)$_2$<br>\|\|<br>C(CF$_3$)$_2$ | 1 | 99 |
| 35 | $CFH=\overset{CH_3}{\underset{\|}{C}}-CN$ | —CFH—$\overset{CH_3}{\underset{\|}{C}}$—<br>\|<br>CN | 65 | 35 |
| 50 | $CF_2=CH-CN$ | —CF$_2$—CH—<br>\|<br>CN | 50 | 50 |
| 25 | $CH_2=CF-CN$ | —CH$_2$—CF—<br>\|<br>CN | 75 | 25 |
| 60 | $CH_2=CF-CF=CH_2$ | —CH$_2$—CF=CF—CH$_2$— | 40 | 60 |
| 80 | $CHF=CF-CF=CHF$ | —CHF—CF=CF—CHF— | 20 | 80 |
| 10 | $CH_2=\overset{CH_3}{\underset{\|}{C}}-\underset{F\ \ F}{\overset{F\ \ CF_3}{\bigcirc}}-CF_3$ | —CH$_2$—$\overset{CH_3}{\underset{\|}{C}}$—<br>CF$_3$—⌬—F<br>F—⌬—CF$_3$ | 90 | 10 |

Example 6

When $CF_3CF=CFCH=CH_2$ is copolymerized in accordance with the method of Example 1 with $$(CF_3)_2CFCF=CH-CH=CH_2$$

and

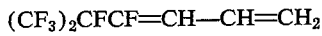

a copolymer is formed consisting essentially of

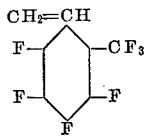

units,

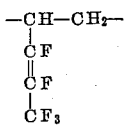

units, and

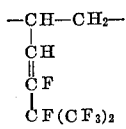

units.

That which is claimed is:

1. A copolymer consisting essentially of (1)

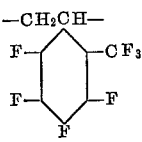

units and (2) at least one unit selected from the group consisting of

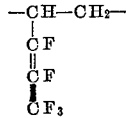

units, where X is selected from the group consisting of fluorine and hydrogen, at least one X being hydrogen, R is selected from the group consisting of fluorine, hydrogen, and perfluoroalkyl radicals, and R' is selected from the group consisting of the trifluoromethyl radical and fluorine, the number of X's that are hydrogen exceeding the number of R's that are hydrogen;

$$-CRZ-CF=CF-CX_2-$$

where Z is selected from the group consisting of the trifluoromethyl radical, fluorine, and hydrogen, X is selected from the group consisting of fluorine and hydrogen, and R is as defined above;

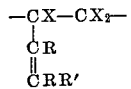

units, where X is as defined above, and Q is selected from the group consisting of hydrogen, fluorine and methyl; and

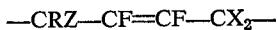

units, where Q' is selected from the group consisting of the trifluoromethyl radical and fluorine, no more than two Q' groups being trifluoromethyl, and Y is selected from the group consisting of methyl radicals and hydrogen.

2. A copolymer consisting essentially of from 5 to 95 mol percent of (1)

units, and from 95 to 5 mol percent of (2) units selected from the group consisting of

units, where X is selected from the group consisting of fluorine and hydrogen, at least one X being hydrogen; R is selected from the group consisting of fluorine, hydrogen and perfluoroalkyl radicals, and R' is selected from the group consisting of the trifluoromethyl radical and fluorine, the number of X's that are hydrogen exceeding the number of R's that are hydrogen;

$$-CRZ-CF=CF-CX_2-$$

where Z is selected from the group consisting of the trifluoromethyl radical, fluorine, and hydrogen, X is selected from the group consisting of fluorine and hydrogen, and R is as defined above;

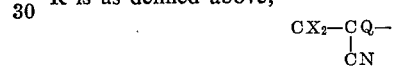

units, where X is as defined above, and Q is selected from the group consisting of hydrogen, fluorine, and methyl; and

units, where Q' is selected from the group consisting of the trifluoromethyl radical and fluorine, no more than two Q' groups being trifluoromethyl, and Y is selected from the group consisting of methyl radicals and hydrogen.

3. A copolymer consisting essentially of from 5 to 95 mol percent of

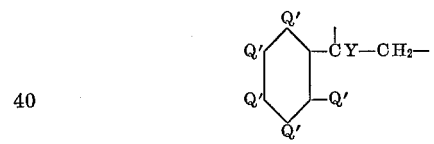

units and from 95 to 5 mol percent of

units.

4. A copolymer consisting essentially of 5 to 95 mol percent of

units and 95 to 5 mol percent

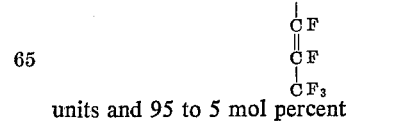

units.

5. A copolymer consisting essentially of 5 to 95 mol percent of
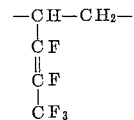
units and 95 to 5 mol percent of
$$-CH-CH_2-$$
$$\phantom{-}|$$
$$\phantom{-}CN$$
units.
6. A copolymer consisting essentially of 5 to 95 mol percent of
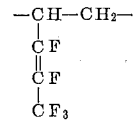
units and 95 to 5 mol percent of
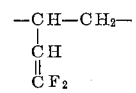
units.
No references cited.
JOSEPH L. SCHOFER, *Primary Examiner.*
HARRY WONG, *Assistant Examiner.*